(12) United States Patent
Wang

(10) Patent No.: US 6,252,971 B1
(45) Date of Patent: *Jun. 26, 2001

(54) DIGITAL WATERMARKING USING PHASE-SHIFTED STOCLUSTIC SCREENS

(75) Inventor: Shen-ge Wang, Fairport, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,095

(22) Filed: Apr. 29, 1998

(51) Int. Cl.⁷ ........................................................ G06K 9/00
(52) U.S. Cl. ............................ 382/100; 382/296; 382/100
(58) Field of Search ..................................... 382/100, 101, 382/118, 119, 120, 212, 284, 232, 248, 250, 296, 293, 280, 276; 358/405; 283/72, 93, 113, 901; 380/54, 55

(56) References Cited

U.S. PATENT DOCUMENTS

| | | | |
|---|---|---|---|
| 5,181,254 | * 1/1993 | Schweizer et al. | 382/1 |
| 5,284,364 | * 2/1994 | Jain | 283/87 |
| 5,488,649 | * 1/1996 | Shamir | 380/54 |
| 5,734,752 | * 3/1998 | Knox | 382/212 |
| 5,790,703 | 8/1998 | Wang . | |
| 5,825,892 | * 10/1998 | Braudaway et al. | 380/51 |
| 5,905,819 | * 5/1999 | Daly | 382/284 |
| 5,946,103 | * 8/1999 | Curry | 358/405 |
| 5,946,414 | * 8/1999 | Cass et al. | 382/183 |
| 5,995,638 | * 11/1999 | Amidror et al. | 382/100 |
| 6,036,233 | * 3/2000 | Braun et al. | 283/91 |
| 6,061,793 | * 5/2000 | Tewfik et al. | 713/176 |

OTHER PUBLICATIONS

Bender et al. "Tchniques for data hiding" SPIE vol. 2420, pp. 170, 1995.*
Knox et al. "Digital watermarks using stochastic screens" SPIE vol. 3018, 1997.*
Kiyoshi et al. "New integrated coding schemes for computer–aided facsimile" IEEE, 1990.*
Kiyoshi et al. "Embedding the attribute information into a dithered image" Scripta Technica, Inc. 1990.*
Yasuhiro et al. "A unified coding method of dithered image and text data using micropatterns" Scripta Technica, Inc. 1989.*
A new era, 1990 IEEE Military communications conference, Monterey, CA.*

* cited by examiner

*Primary Examiner*—Andrews W. Johns
*Assistant Examiner*—Amir Alavi
(74) *Attorney, Agent, or Firm*—Oliff & Berridge, PLC.

(57) ABSTRACT

A system and method for digital watermark embedding and retrieval using phase shift stoclustic (stochastically clustered) screens. Watermarks are embedded based on the phase shift of clustered halftone screens. Therefore, the hidden information, or invisible watermark, can be detected and visualized by correlating clusters as opposed to the pixel-based correlation required by other methods. Therefore, the detection of watermarks is much easier, especially when distortions have been introduced into the embedded image. By replacing regular cluster halftone screens with stoclustic screens for hidden watermarks, watermarks can quickly be embedded and retrieved

23 Claims, 10 Drawing Sheets

DIGITAL WATERMARKING USING PHASE-SHIFTED STOCLUSTIC SCREENS

BACKGROUND OF THE INVENTION

1. Field of Invention

This invention is directed to a system and method for embedding and automatically detecting invisible digital watermarks in halftone images, or any image which uses microstructures to simulate a continuous tone image.

2. Description of Related Art

Methods for protecting copyrightable works have evolved from a simple designation below the work to highly complex methods for embedding watermarks in the work. Watermarking can take two basic forms: visible and invisible. Visible watermarks are the commonly-seen copyright logos or symbols that are generally affixed to the work before sales or distribution. Especially in the case of images, the presence of the watermark is very visible, and is generally difficult to remove without damaging the image. Generally speaking, visible watermarks do not harm the image, even though the watermarks may detract from the overall esthetics of the image. Furthermore, the visible watermark is a potential target for fraud. Since a fraudulent copier is actually placed on notice regarding the presence of the watermark, it is possible to attempt to remove the visible watermark from the image.

Invisible watermarks are far more creative and can encompass the standard and commonly seen copyright logos or symbols, as well as company logos, serial numbers, origin and identification marks, and/or encrypted data. These invisible watermarks are embedded into the work in a way which is not generally discernable without the aid of a visualization device such as a key or a computer. Theoretically, these embedded images can be retrieved from the work anytime in the work's history or from any other form or embodiment into which the work may have been translated. This allows the owner to track the work and to clearly establish ownership rights when those rights are in dispute. Furthermore, since the embedded watermark image is essentially invisible to the unaided eye, the likelihood of tampering with or removal of the watermark is reduced.

SUMMARY OF THE INVENTION

This invention provides a system and method for embedding and retrieving digital watermarks that overcomes the problems associated with recovering these marks from non-original images.

This invention further provides a system and method that allows previously unretrievable embedded invisible watermarks to be recovered from works that have been converted from a digital format to a printed copy, such as a print, or from a reproduction made, for example, on a photocopier.

This invention also provides a system and method that uses phase-shifted stoclustic screens that are capable of embedding an invisible watermark in an image.

This invention additional provides a system and method that uses different transition halftones screens as tiles to compose character-shaped watermarks in an image.

Invisible watermark retrieval depends generally on the pixel-to-pixel comparison between a bitmap of a halftone image and the bitmap of a halftone image having a certain shift relative to itself. In some areas the bitmap and its shifted version are highly correlated, i.e., near identical, while in other areas they are uncorrelated or highly "conjugately correlated," i.e., one bitmap is the inverse of the other bitmap. The pixel-to-pixel comparison between the original and the shifted bitmaps can provide a contrast between the correlated areas and other areas. Therefore, the embedded, or hidden, watermark becomes visible.

However, retrieval of the original bitmaps from printed copies is not trivial, especially from high-resolution printed copies. Both printing and scanning processes introduce overlapping, distortion and nonuniformity, as well as noise, to the embedded image. The exact bitmap information in very dark regions of the image of the printed copy is difficult to recover. Even in the brighter regions of the image, where there is greater contrast, retrieving the digital watermark is expected to be successful only in a statistical sense. A spatial separation between the two adjacent correlated halftone patterns varies and the amount of shift is generally not an integer number of bitmap pixels on rescanned images. Accurately determining the spatial separation, or the location or the correlation peak, becomes the most critical requirement when attempting to retrieve hidden watermarks.

Regular cluster halftone screens generate cluster dots aligned with a predefined grid. However, stochastically clustered or "stoclustic" screens provide the freedom to locate the clusters arbitrarily. Therefore, it is possible to design stoclustic screens with watermarks in a similar manner to stochastic screens, in which the centers of the clusters are stochastically located. Therefore, information hidden by stoclustic screens are based on the cluster-to-cluster correlation, so that detection of invisible watermarks will be easier than the pixel-to-pixel correlation. However, stochastically embedded large clusters do not look pleasant, and are generally only useful where the embedded clusters are small.

Therefore, by using phase-shift stoclustic screens, a method of embedding and retrieving cluster screens is available which is suitable to applications where replacing halftone dots by large stochastic screens is not desirable.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
FIG. 1 is a halftone image containing an embedded invisible or embedded digital watermark according to this invention.

FIG. 1 shows an image 100 embedded with an invisible watermark in accordance with this invention. After the watermark retrieval process according to this invention, the embedded watermark, here the letter "T" 110, becomes visible, as shown by the image 100' in FIG. 2.

Figure 3:
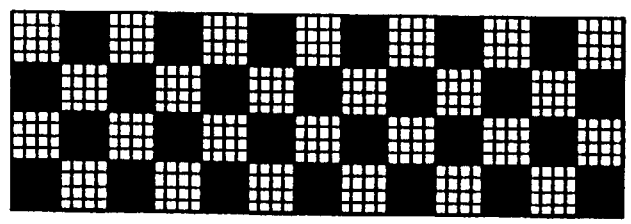
FIG. 3 shows a halftone pattern generated by a normal halftone screen.
Figure 4:
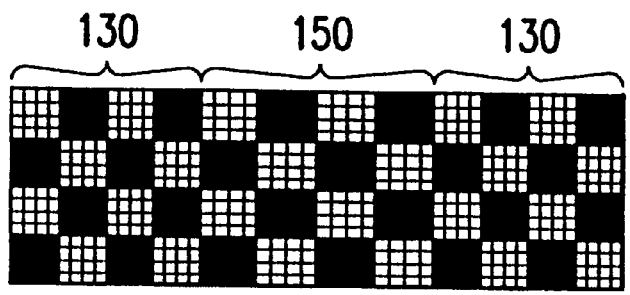
FIG. 4 shows a halftone pattern generated by a phase-shifted halftone screen.
Figure 5:
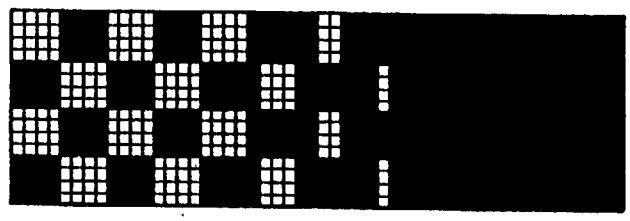
FIG. 5 shows the result of overlaying FIG. 3 on FIG. 4.

FIGS. 3–5 illustrate the effect phase shifting has on halftone patterns. FIG. 3 shows a checkerboard halftone pattern created by a regular 45-degree cluster halftone screen. FIG. 4 shows another checkerboard pattern created by a halftone screen having four slightly stretched columns 150 in the middle section. Due to the pitch difference between the regular columns 130 and the slightly stretched columns 150, the phase, which represents the transition between white and black, has changed from "in phase," ie., zero phase shift, on the left to "opposite phase," ie., π phase shift, on the right. FIG. 5 illustrates the result as FIG. 3 is overlaid with FIG. 4. FIG. 5 clearly illustrates the gradual disappearance of the checkerboard pattern, scanning from left to right in the image, which is proportional to the amount of phase difference between FIGS. 3 and 4.

Therefore, if a portion of an image is encoded with π phase-shifted clusters and immediately surrounding these π phase-shifted clusters are clusters which vary from π phase-shifted to zero phase-shifted, by overlapping a checkerboard pattern of the same spatial frequency, a high contrast watermark defined by the portion with the phase shift is produced.

However, a sudden change in the pitch of a cluster can cause noticeable contour anomalies in the embedded image around the watermark. This detracts from the overall aesthetic qualities of the image as well as places a potential copyright infringer on notice regarding the presence of a watermark. Stoclustic screens with cluster centers specified in floating point numbers provide smooth transitions when coupled with an appropriate rate of phase transition. Assuming the transition from zero phase shift to π phase shift occurs over N periods, the pitch difference, $\Delta P_i$ is defined as $$\Delta P_i = K \cdot \sin^2(\pi \cdot i / N)$$

where i=0, 1, . . . , N-1 and the coefficient K is determined by:

$$\Sigma \Delta P_i = P/2,$$

where P denotes the regular pitch and the summation is taken over N periods.

In FIG. 1, the halftone image is embedded with a digital watermark using phase-shifted clusters. The transition into the phase-shifted cluster is almost completely invisible unless the viewer looks at the image at a glancing incidence and along the 45 degree direction. For this particular example, the black and white clusters are approximately 9 pixels by 9 pixels, or 81 pixels square, and the phase transition is arbitrarily conducted in 10 periods. Therefore, the phase change from 0 to π happens within an approximately 800 pixel distance in any direction.

Capitalizing on the qualities exhibited by the phase-shifted clusters shown in FIGS. 3–5, a plurality of different watermarks using a set of pre-designed stoclustic screens, or halftone tiles, can be designed.

Figure 6:
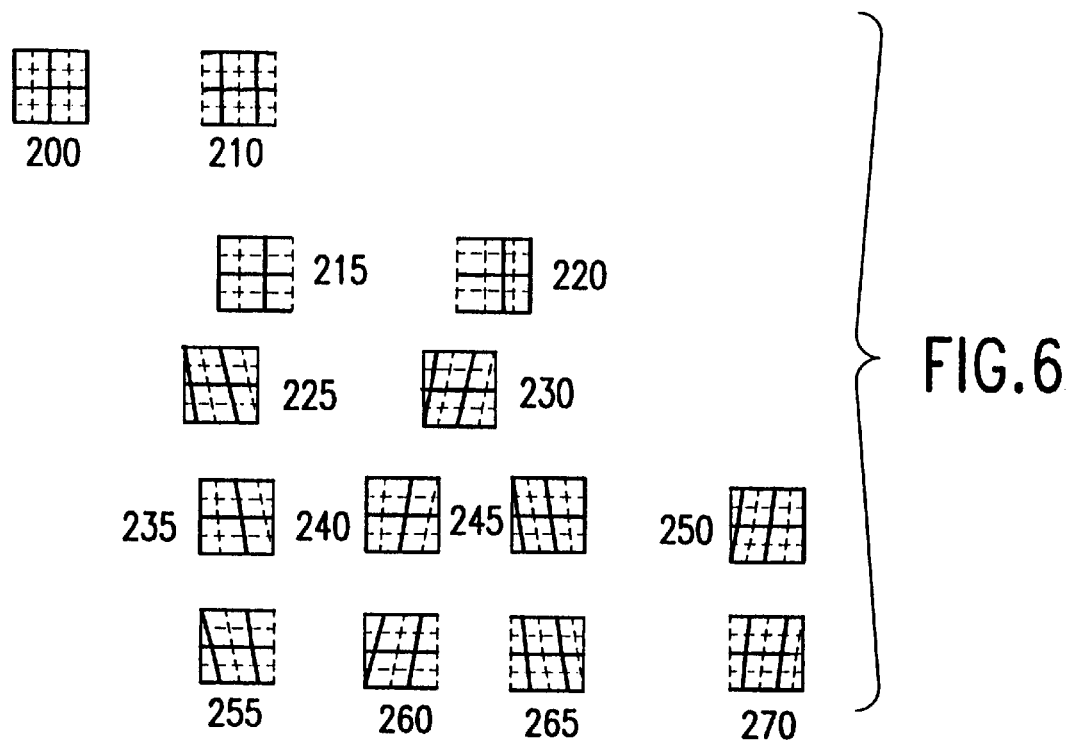
FIG. 6 shows a set of phase transition tiles according to this invention.

FIG. 6 illustrates a series of tiles which accomplish the cluster phase shift from zero phase shift to π phase shift and back to zero phase shift. The tiles 200 and 210 illustrate base tiles A and B. The solid lines indicate the contour of zero phase shift, and the dash lines indicate the contour of π phase shift. Both A and B base tiles 200 and 210 have a fixed period, but the A base tile 200 has a π phase difference compared to the B base tile 210. The tiles 215 and 220 are the horizontal transition tiles HA-B and HB-A, respectively. To aid in understanding the nomenclature used for describing each tile, the labeling is derived from:

Base tiles: A and B
Horizontal transition tiles: HA-B (tile with an A-to-B horizontal phase transition)
Vertical transition tiles: VB-A (tile with a B-to-A vertical phase transition)
A corner transition tiles: AC1, etc.
B corner transition tiles: BC4, etc.

The tiles 215 and 220 are the vertical transition tiles VA-B and VB-A, respectively. The tiles 235, 240, 245 and 250 are the A corner transition tiles AC1, AC2, AC3, and AC4, respectively. The tiles 255, 260, 265 and 270 are the B corner transition tiles BC1, BC2, BC3 and BC4, respectively. These tiles establish the basic building blocks from which zero phase-shifted clustered halftones can be converted to π phase-shifted cluster halftones. It should be noted that these tiles are illustrative in nature and can contain more than two periods in each dimension.

Figure 2:
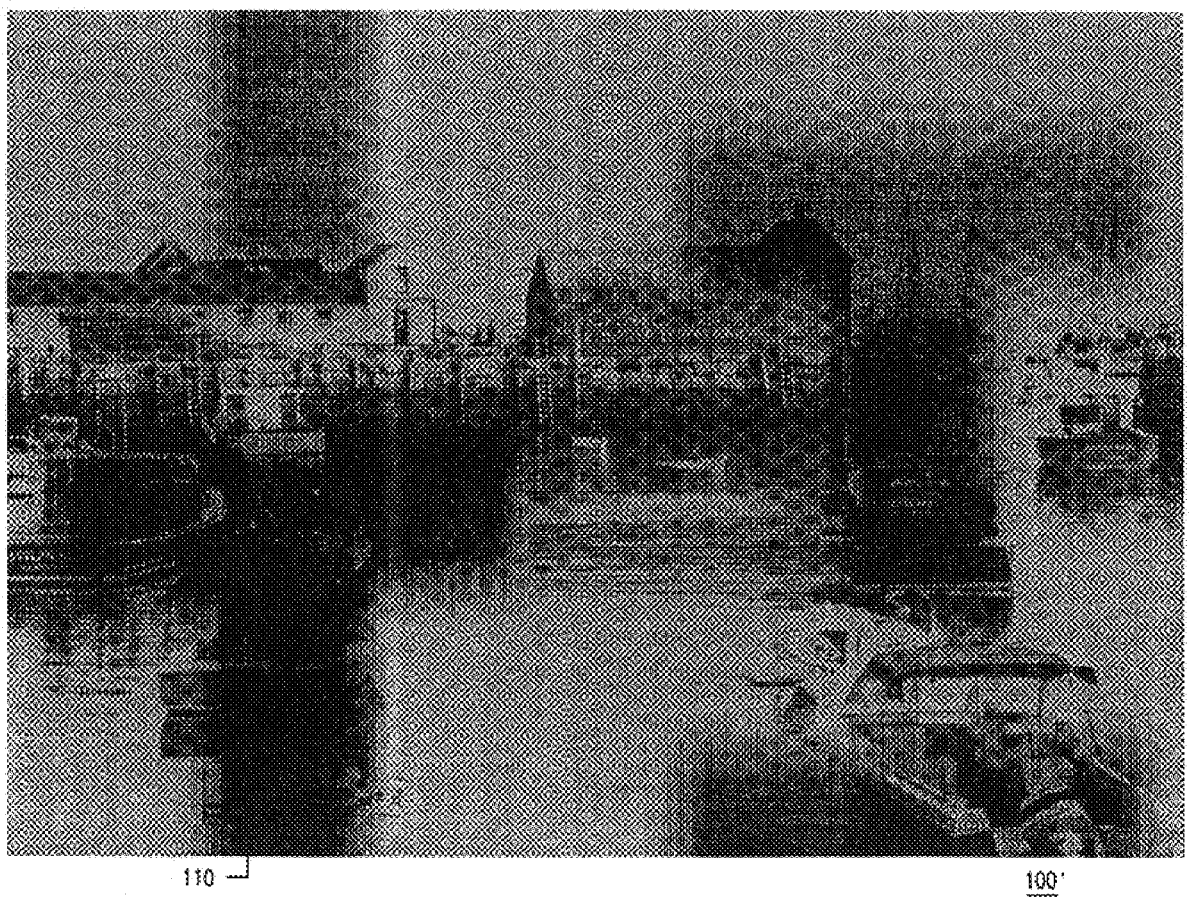
FIG. 2 shows the embedded watermark retrieved using the method and apparatus according to this invention.
Figure 7:
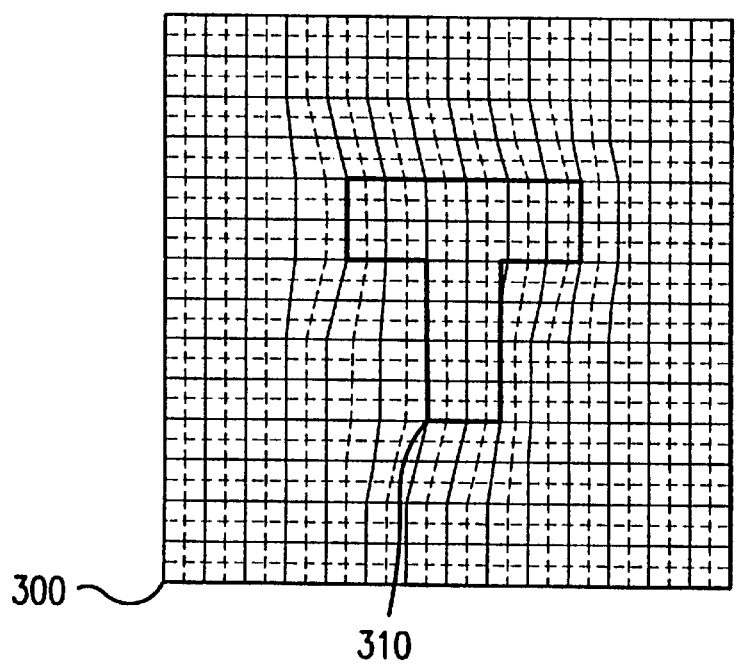
FIG. 7 shows an embedded character using the phase transition tiles of FIG. 6.

By arranging the tiles in a particular orientation, a plurality of different characters, which are eventually embedded as the watermark, can be designed. For example, FIG. 7 shows a composed stoclustic screen 300 with a watermark in the shape of a "T" 310, which has been highlighted for visualization. The halftone image created by the above-defined halftone tiles will carry the hidden "T" watermark 310 where the B base tile 210 is located. Detecting the "T" watermark 310 can be visualized by overlapping the stoclustic screen 300 shown in FIG. 7 with a checkerboard pattern in the same halftone frequency or simply using the stoclustic screen 300 with a proper shift for overlapping of portions of the stoclustic screen 300 generated from A and B base tiles 200 and 210, respectively. FIG. 2 is a black and white image created by a composed stoclustic screen revealing a large hidden letter "T" after visualization.

The image 100', shown in FIG. 2, illustrates the presence and clarity of the embedded digital watermark 110 after retrieval from the original watermark-encoded image 100 shown in FIG. 1. Watermark detection is visualized by overlapping the image 100' with a checkerboard pattern in the same halftone frequency or simply using the same image with a proper shift for overlapping of portions generated from the tile A and B base tiles 200 and 210, respectively.

Therefore, it is possible to design a stoclustic screen with a desirable watermark and with phase transitions in all directions which does not affect the aesthetic attributes of the image. Furthermore, one skilled in the art can appreciate the application of this invention to color as well as to black and white images. For color images, specifically CMYK ink color halftone images, the yellow channel might be the best choice to hide digital watermarks since the phase transitions will be less noticeable when embedded in the yellow color separation layer, thereby producing more freedom in screen design. However, hiding digital watermarks in any one, some or all of the color separation layers is possible with variations in the aesthetic quality of the image.

Thus, by using the method and system of this invention, retrieving watermarks from images that have not been outside the digital realm is straightforward. Since the retrieval by using the method and system of this invention is based on a cluster-to-cluster comparison, retrieving the same watermarks after the image has been transferred to a printed copy is also easy and provides clear, visible results. Therefore, the method and system of this invention overcomes the shortcomings associated with other watermarks that are based on pixel-to-pixel embedding and retrieval.

However, it should be appreciated that the image to be embedded is not limited in any way to a printed image. The only requirement for retrieving an embedded digital watermark is that the image on which the retrieval operation is performed was once encoded within an embedded digital watermark. The system and method of this invention works equally well on images that have been printed and subsequently scanned, that have been previously converted into a digital image, or that have been maintained in electronic form.

Figure 8:
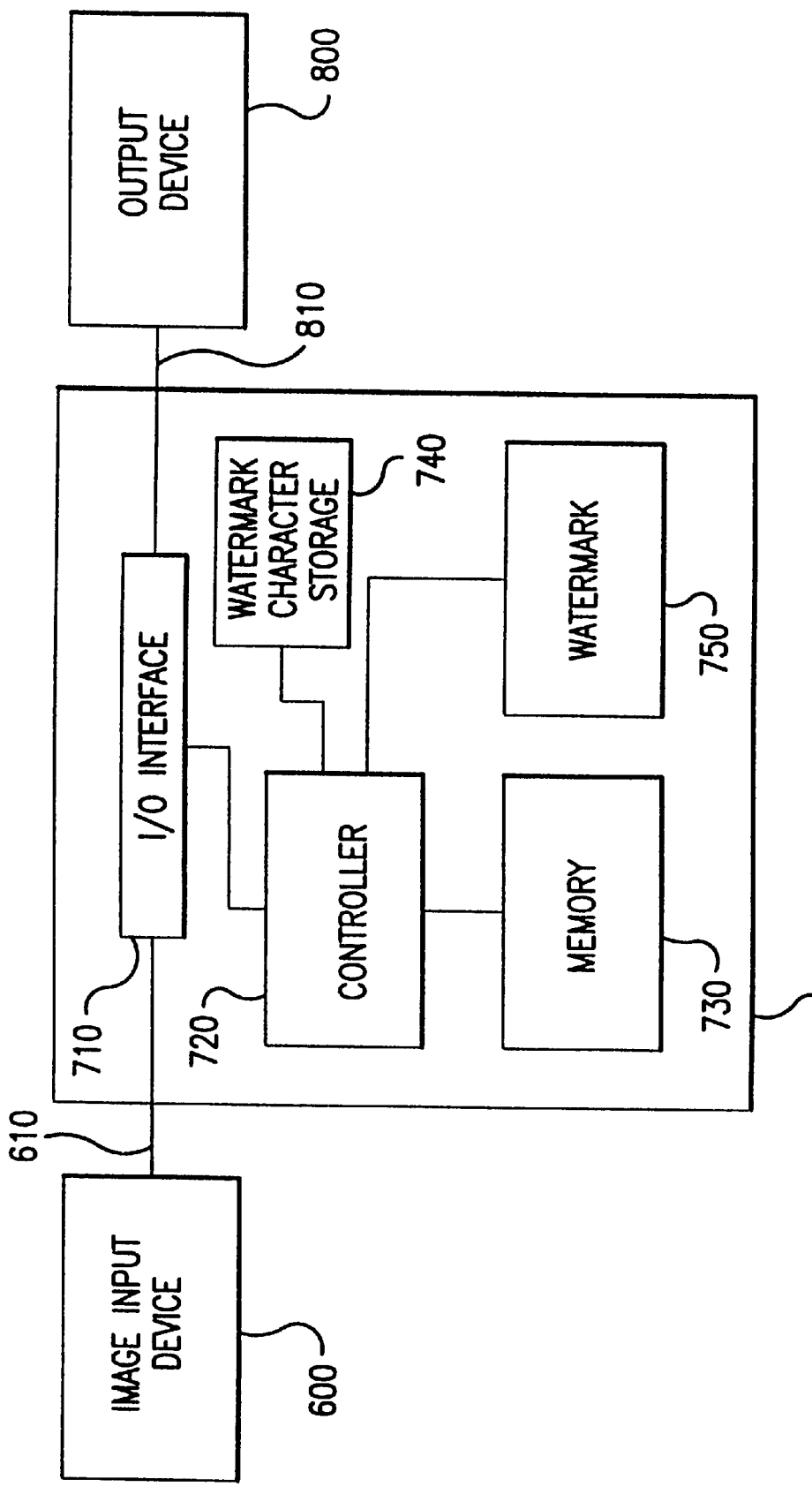
FIG. 8 is a functional block diagram of a watermark embedding device according to this invention.

FIG. 8 shows a watermark embedding device 700 for embedding digital watermarks in an image according to this invention. As shown in FIG. 8, an image is input from an image input device 600 over a link 610 to the watermark embedding device 700. It should be appreciated that the image input device 600 can be any device that stores and or generates an electronic version of the image.

Thus, the image can be a printed hard copy version of the image, and the image input device 600 can be a scanner that scans and outputs an electronic version of the image over the link 610 to the watermark embedding device 700. Furthermore, the image input device 600 and the watermark embedding device 700 can be elements integrated into a digital photocopier.

Similarly, the image input device 600 can be a server or other note on a local area network, a wide area network, and intranet, the Internet or any other distributed network. In this case, the image is already stored on the network in electronic form. Finally, the link 610 can be a wired or wireless link to the scanner or other image conversion device or the network that forms the image input device 600. Thus, the image input device 600 and the link 610 can be any known elements that are capable of supplying an electronic image to the watermark embedding device 700.

As discussed above, the system and method of this invention works equally well on images that have not been transferred to hard copy. In this case, the image is already in digital format and the image is ready for processing by the watermark embedding device 700.

The watermark embedding device 700 includes an I/O interface 710, a controller 720, a memory 730, a watermark character storage 740 and a watermarker 750. An image is received from the image input device 600 via the link 610. The I/O interface 710 forwards the input image data received from the image input device 600, under the direction of the controller 720, to the memory 730. The watermarker 750 processes the image based on the type of watermark to be embedded. The watermarker 750 then retrieves the selected watermark character or characters from the watermark character storage 740. The watermarker 750 then embeds the selected watermark character or characters into the input image. This resulting image is then output via the I/O interface 710 and a link 810 to an output device 800. It should be appreciated that the output device 800 can be any device that stores, outputs or displays the resulting image data.

Figure 9:
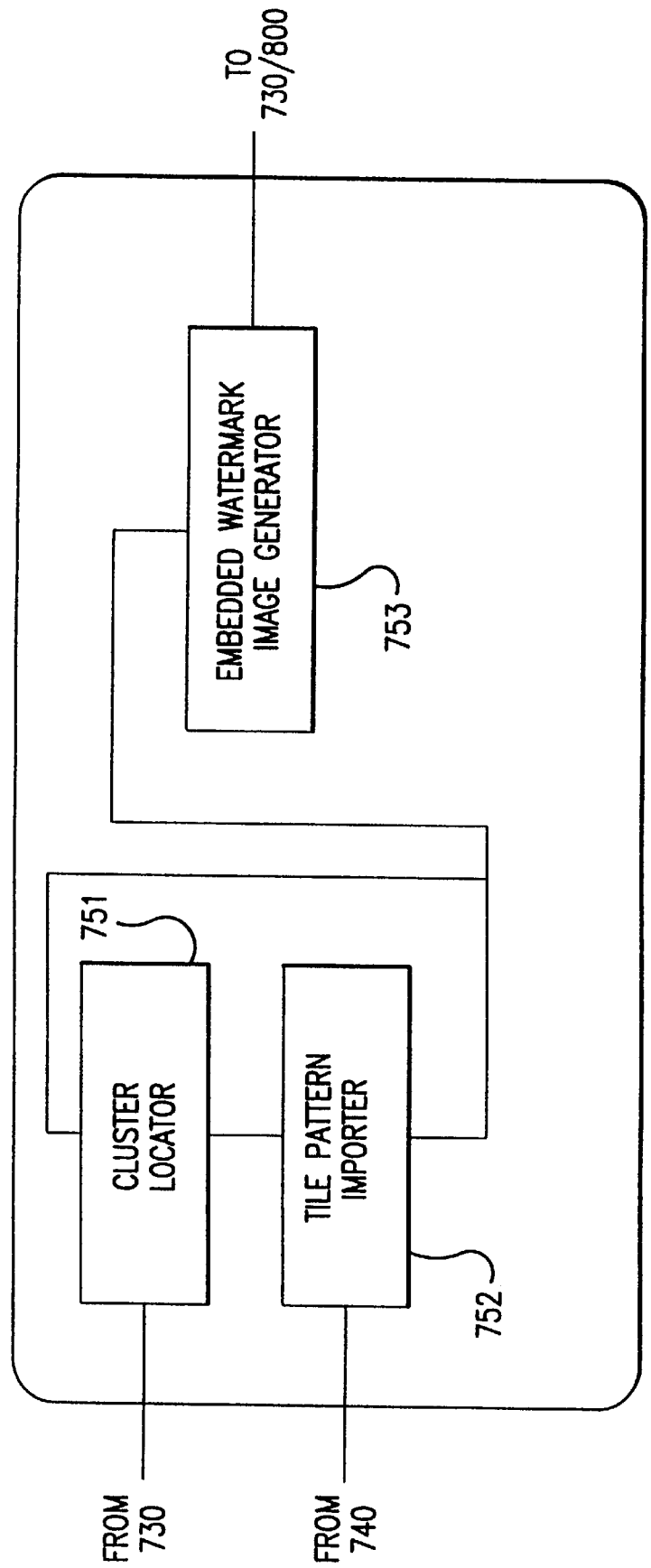
FIG. 9 is a functional block diagram showing the watermarker of FIG. 8 in greater detail.

As shown in greater detail in FIG. 9, the watermarker 750 functionally includes a cluster locator 751, a tile pattern importer 752 and an embedded watermark image outputter 753. The watermarker 750 inputs the input image from the memory 730. The cluster locator 751 stocastically locates clusters throughout the input image. With the cluster centers chosen for the located clusters, the tile pattern importer 752 inputs, from the watermark character storage 740, the appropriate sequence of tiles corresponding to the desired watermark character or characters. The embedded watermark image generator 753 then embeds the tiles in the image based on a modified halftone process which requests, and then assembles, the correct sequence of tiles for the requested shape or watermark character or characters. The resulting image is then output from the embedded watermark image generator 753 to the memory 730 or directly to the output device 800.

The resulting image can be a printed or copied version of the input image, and the output device 800 can be a printer. Similarly, the output device 800 can be a monitor which is capable of displaying an electronic version of the resulting image for viewing. Furthermore, the image input device 600, the watermark embedding device 700 and the output device 800 can be elements integrated into a single device, such as a digital photocopier.

Similarly, the output device 800 can be a server or other note on a local area network, a wide area network, an intranet, the Internet or any other distributed network. In this case, the resulting image is transferred and stored on the network in electronic form. Finally, the link 810 can be a wired or wireless link to the output device 800 or any other image output or display device or to the network. Thus, the output device 800 and the link 810 can be any known elements that are capable of receiving and outputting or storing the resulting electronic image from the watermark embedding device 700.

Figure 10:
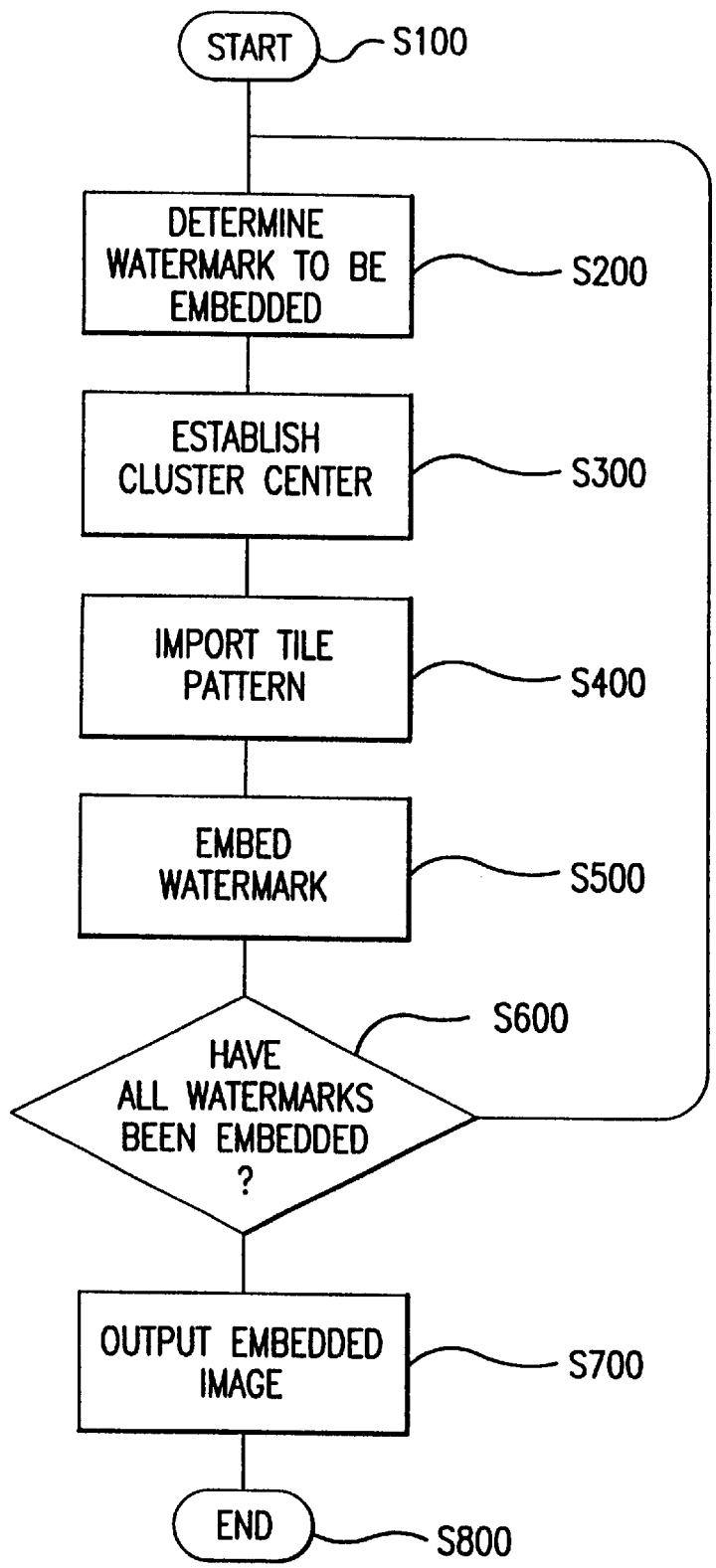
FIG. 10 is a flowchart outlining the watermark embedding process according to this invention.

FIG. 10 outlines a method according to this invention for embedding watermarks into images that have been converted to electronic form. Beginning in step S100, control continues to step S200. In step S200, the watermark to be embedded is selected. It should be appreciated that if the image is not already in electronic format, the image is converted via the image input device to electronic format.

In step S300, the cluster centers are selected throughout the input image. Next, in step S400, the tile pattern corresponding to the selected watermark is imported. The tile pattern corresponding to the individual characters or watermarks and are predefined. However, it should be appreciated that any character or symbol can be defined in the watermark character storage device 740. Then, in step S500, the tiles are embedded into the input image. Control then continues to step S600.

In step S600, a determination is made as to whether all watermarks have been embedded. If there are more watermarks to be embedded, control continues back to step S200 to begin the embedding process again. If the embedding process is complete, control passes to step S700. In step S700, the embedded image is output. Control then continues to step S800, where the control routine stops.

It can be appreciated by one skilled in the art that the system and method of this invention is not limited to embedding of one single character as the watermark. The method and system of this invention can be straightforwardly modified to allow for multiple characters or character strings to be embedded into the same image.

Furthermore, it also should be appreciated that a pre-designed set of halftone tiles representing one or more characters can be used as a single regular halftone screen throughout the entire images. Therefore, the same watermark can be embedded periodically into the halftone image and the process described above correspondingly simplified.

Figure 11:
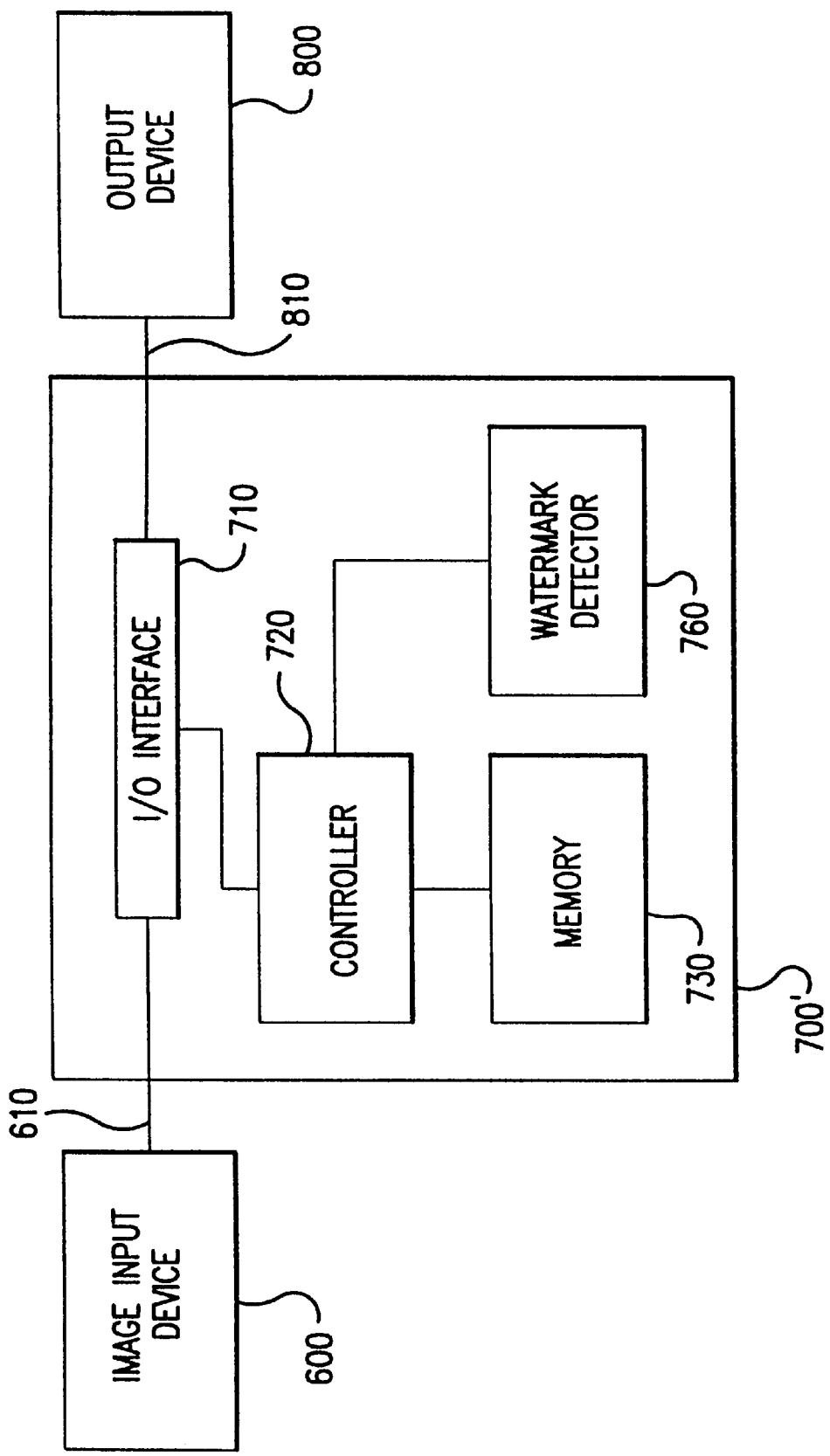
FIG. 11 is a functional block diagram of a watermark retrieval device according to this invention.

FIG. 11 shows a watermark extracting device 700' for extracting embedded digital watermarks from an image according to this invention. As shown in FIG. 11, an image containing an embedded digital watermark is input from an image input device 600 over a link 610 to the watermark extraction device 700'. It should be appreciated that the image input device 600 can be any device that stores or generates an electronic version of the image. As discussed above, the system and method of this invention works equally well on images that have not been transferred to hard copy. In this case, the image is already in digital format and the image is ready for processing by the watermark extraction device 700'.

The watermark extraction device 700' includes the I/O interface 710, the controller 720, the memory 730, and a watermark detector 760. The I/O interface 710 forwards the input image data received from the image input device 600, under the direction of the controller 720, to the memory 730. The watermark detector 760 processes the image based on locating cluster centers and comparing the surrounding tiles based on a cluster-to-cluster correlation. This resulting image is then output via the I/O interface 710 and the link 810 to the output device 800. It should be appreciated the output 800 can be any device that outputs or displays the resulting image data.

Figure 12:
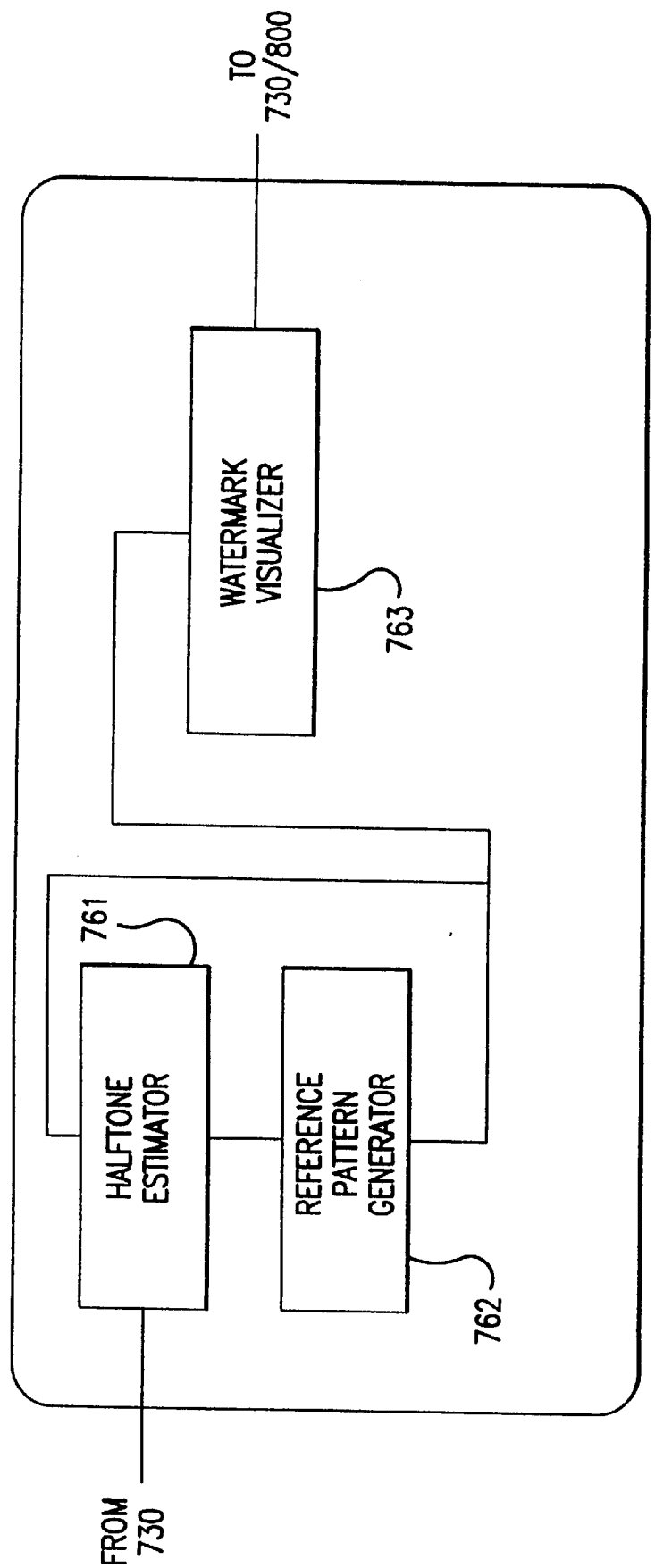
FIG. 12 is a functional block diagram outlining in greater detail the watermark detector of FIG. 11 in greater detail.

As shown in greater detail in FIG. 12, the watermark extraction device 760 functionally includes a halftone estimator 761, a reference pattern generator 762 and an embedded watermark visualizer 763. The watermark detector 760 inputs the image from the memory 730. The halftone estimator 761 can use any known technique for estimating the average amplitude and the angle of the halftone frequency. In one preferred embodiment, the halftone estimatro 761 applies a Fast Fourier Transform (FFT) technique to the image. With this estimation by the halftone estimator 761, the reference pattern generator 762 creates a checkerboard pattern with the estimated average halftone frequency and amplitude of the input image. The watermark visualizer 763 then overlaps the checkerboard pattern with the input image and displays the result with the now visible watermark.

In another preferred embodiment, the halftone estimator 761 includes a number of predetermined checkerboard halftone screens having different frequencies and amplitude. In this case, the halftone estimator 761 applies one or more of the predetermined screens to identify the predetermined screens that most closely approximate the average amplitude and angle of the halftone frequency used in the image being analyzed.

Figure 13:
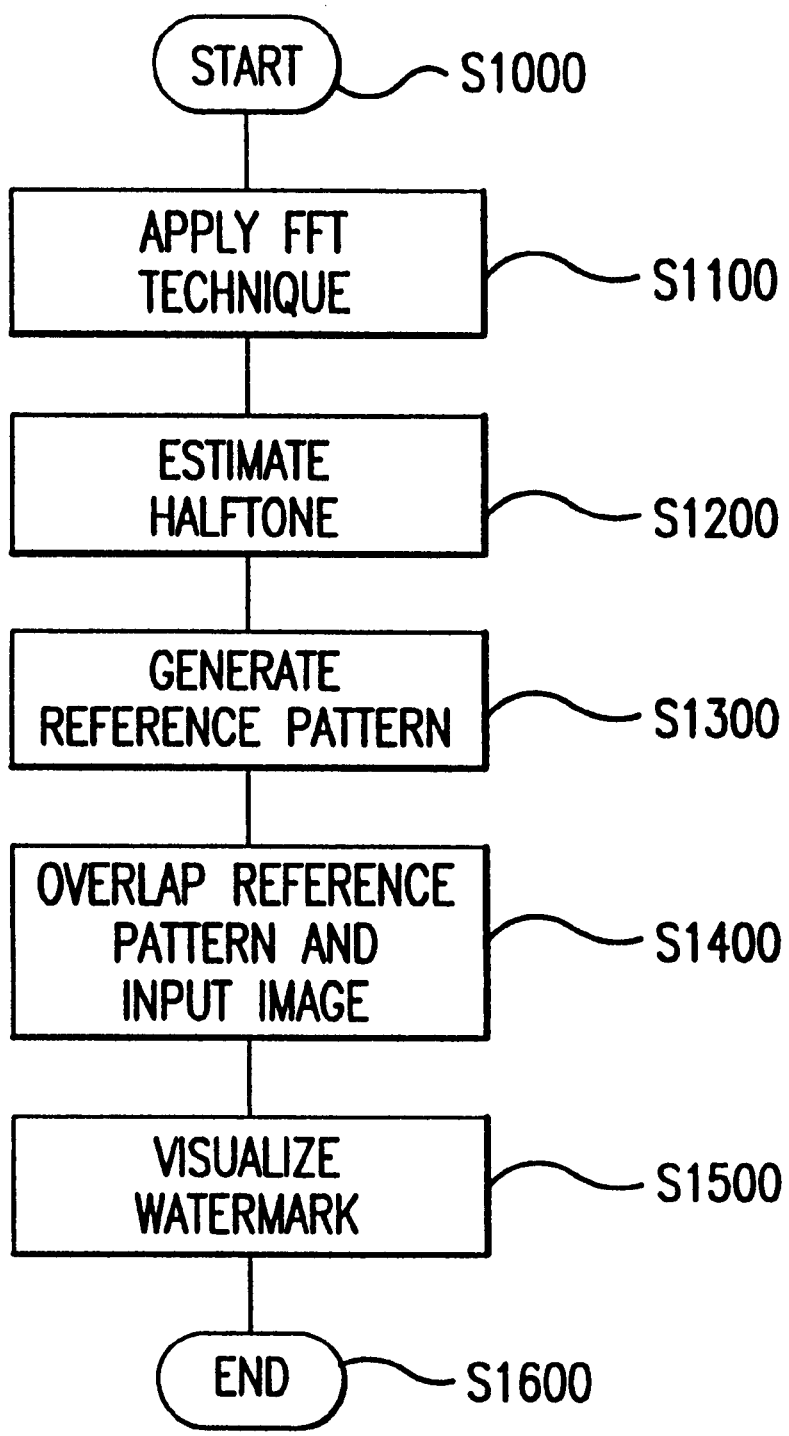
FIG. 13 is a flowchart outlining the watermark retrieval process according to this invention.

FIG. 13 outlines one preferred method according to this invention for retrieving watermarks from images that have an embedded watermark. Beginning in step S1000, control continues to step S1100. In step S1100, a Fast Fourier Transform is applied to the image. It should be appreciated that if the image is not already in electronic format, the image is converted via the image input device to electronic format.

In step S1200, an estimation of the halftone is generated based on the average amplitude and angle of the halftone frequency determined in step S1100. Next, in step S1300, with the halftone estimated, a reference pattern is generated. This reference pattern is a checkerboard having the same halftone frequency and the same size of the input image. Then, in step S1400, the reference pattern is overlapped with the input image. Control then continues to step S1500.

In step S1500, the watermark is visualized. Control then continues to step S1600, where the control routine stops.

However, it should be appreciated that since the reference pattern used for watermark retrieval only depends on the average halftone frequency of the image with invisible watermarks, the reference pattern can be selected from a collection of pre-printed checkerboard transparencies with different frequencies. Thus, in a second preferred method according to this invention, by visually comparing the frequencies of the collection to the input image, a reference pattern with approximately the same frequency of the image can be chosen. Then, by overlaying the reference transparency on the image, and aligning the reference pattern with the halftone frequency direction of the embedded image, the watermark is visualized and watermark is retrieved. It should further be appreciated that this second preferred method can be performed either manually or automatically.

As shown in FIGS. 8 and 11, the watermark embedding device 700 and the watermark extraction device 700', respectively, are preferably implemented either on a single programmed general purpose computer or separate programmed general purpose computer. However, the watermark extraction device 700 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts, shown in FIGS. 10 and 13, can be used to implement either or both of the watermark embedding device 700 and the watermark extracting device 700'.

It is, therefore, apparent that there has been provided in accordance with the present invention a method and apparatus for embedding and retrieving embedded digital watermarks from prints. While this invention has been described in conjunction with preferred embodiments thereof, it is evident that many alternatives, modifications, and variations be apparent to those skilled in the art. Accordingly, applicants intend to embrace all such alternatives, modifications and variations that fall within the sphere and scope of this invention.

I claim:

1. A method for embedding an invisible digital watermark in an image using phase-shifted stochastically clustered screens, comprising:

inputting an image to be embedded with a watermark;

determining the watermark to be embedded;

establishing cluster centers in the input image;

embedding a phase-shifted cluster containing the watermark into the input image, wherein a size of the phase-shifted cluster is modulated according to a desired phase-shift;

repeating the determining, establishing and embedding steps until all water marks have been embedded; and outputting the image containing the embedded invisible digital watermark.

2. The method of claim 1, wherein establishing cluster centers comprises stochastically locating cluster centers throughout the input image.

3. The method of claim 1, wherein the embedding the phase-shifted cluster comprises importing the phase-shifted cluster into the input image.

4. The method of claim 1, wherein embedding a phase-shifted cluster comprises importing a sequence of tiles, the tiles comprising the phase-shifted cluster and corresponding to the desired watermark, the sequence of tiles shifting the phase-shifted cluster from zero phase shift to $\pi$ phase shift and back to zero phase shift.

5. The method of claim 4, wherein the tiles determining the phase shift in the cluster are governed by:

$$\Delta P_i = K \cdot \sin^2(\pi \cdot i/N)$$

where:

N is the number of periods;

$\Delta P_i$ is the pitch difference; and i=0, 1, . . . , N−1.

6. The method of claim 5, wherein the coefficient K is determined by:

$$\Sigma \Delta P_i = P/2,$$

where P denotes the regular pitch, and the summation is taken over N periods.

7. The method of claim 1, wherein embedding the phase-shifted cluster comprises embedding the phase-shifted cluster based on a modified halftone process.

8. A system for embedding digital watermarks comprising:

an image input device;

a watermark embedding device using phase-shifted stochastically clustered (stoclustic) screens, wherein a size of a portion of the stoclustic screens is modulated according to a desired phase-shift, comprising:

A watermark circuit, and

A watermark character storage device; and

An output device.

9. The system of claim 8, wherein the watermarker circuit embeds the phase-shifted stoclustic screens and comprises:

a cluster center locator;

a tile pattern importer; and an embedded watermark image generator.

10. The system of claim 9, wherein the cluster center locator stochastically locates cluster centers throughout the input image.

11. The system of claim 9, wherein the tile pattern importer imports predefined phase-shifted stoclustic screens.

12. The system of claim 8, wherein the watermark character storage device stores predefined watermarks in the form of phase-shifted stoclustic screens and contains a set of predefined tiles which accomplish the cluster phase shift from zero phase shift to π phase shift and back to zero phase shift.

13. The system of claim 8, further comprising a controller and a memory.

14. A method for retrieving an embedded invisible digital watermark in an image comprising:

inputting an image from which the watermark is to be retrieved;

estimating a halftone for the input image;

generating a phase-shifted stochastically clustered stoclustic reference pattern based on the estimated halftone, wherein a size of a portion of the stoclustic reference pattern is modulated according to a desired phase-shift;

overlapping the reference pattern and the input image;

visualizing the watermark; and outputting the image containing the now visible digital watermark.

15. The method of claim 14, wherein estimating the halftone comprises estimating an average amplitude and an angle of a halftone frequency of the halftone.

16. The method of claim 15, wherein estimating the halftone comprises applying a Fast Fourier Transform to the image.

17. The method of claim 14, wherein generating the reference pattern comprises using the estimated halftone to generate a reference pattern.

18. The method of claim 17, wherein the reference pattern comprises a checkerboard having the same halftone frequency and the same size as the input image.

19. A system for retrieving digital watermarks comprising:

an image input device;

a watermark extraction device using phase-shifted stochastically clustered (stoclustic) screens, wherein a size of a portion of the stoclustic screens is modulated according to a desired phase-shift, comprising:

A halftone pattern generator, and

A watermark visualizer; and

An output device.

20. The system of claim 19, wherein the halftone estimator estimates an average amplitude and an angle of a halftone in the input image.

21. The system of claim 19, wherein the reference pattern generator generates a reference pattern comprising a checkerboard having the same halftone frequency and size of the input image.

22. The system of claim 19, wherein the watermark visualizer further comprises an image overlapper that overlapps the input image and the reference pattern.

23. The system of claim 19, further comprising a controller and a memory.

* * * * *